United States Patent

David et al.

[15] 3,643,025

[45] Feb. 15, 1972

[54] INFORMATION TRANSMISSION SYSTEMS

[72] Inventors: Vivian David; David J. Norton, both of King's Cross, London, England

[73] Assignee: Westinghouse Brake and Signal Company, Limited, London, England

[22] Filed: Aug. 1, 1969

[21] Appl. No.: 846,743

[30] Foreign Application Priority Data

Aug. 2, 1968 Great Britain......................36,944/68

[52] U.S. Cl.......................................178/69.5 R, 340/171 A

[51] Int. Cl...........................................................H04l 7/00

[58] Field of Search..........340/164 R, 164 B, 171 A, 171 PF, 340/167 R; 178/69.5 R; 179/15 BA

[56] References Cited

UNITED STATES PATENTS

| | | | |
|---|---|---|---|
| 3,344,400 | 9/1967 | Nemeth | 340/164 |
| 3,482,046 | 12/1969 | Hughson et al. | 179/15 BA |

*Primary Examiner*—Robert L. Griffin
*Assistant Examiner*—Donald E. Stout
*Attorney*—H. A. Williamson and J. B. Sotak

[57] ABSTRACT

This invention relates to an information-communicating system for receiving and synchronizing information data transmitted from one location to a remote location. The information-communicating system includes a receiving-addressing means, a data control means, a false data inhibiting means, a temporary storage means and a permanent register means. The receiving-addressing means sequentially receives a predetermined number of frequency inputs as well as a data input which has a first and a second binary condition. The receiving-addressing means sequentially produces the same predetermined number of binary outputs in accordance with the binary condition on the data input. These binary outputs of the receiving-addressing means are initially stored in the temporary storage means, and only permanently and synchronously registered as outputs by the permanent register means after all binary outputs from the receiving-addressing means have been temporarily stored in the temporary storage means and if there simultaneously is produced a predetermined condition from the false data inhibiting means to the permanent register means.

10 Claims, 2 Drawing Figures

INVENTORS
Vivian David and
David John Norton.
BY John B Sotak

INVENTORS
Vivian David and
David John Norton.
BY
John B. Sotak

INFORMATION TRANSMISSION SYSTEMS

This invention relates to information transmission systems and relates particularly to information-scanning transmission systems in which a plurality of items of information at one location are scanned for transmission to one or further locations.

According to the present invention there is provided an information-scanning transmission system for transmitting items of information from one location to a remote location in which means is provided for coding such items of information together with the appropriate receiving store address as a combination of frequencies and means for transmitting the frequencies over a transmission link to the remote location, the remote location having means for decoding successive combinations of received frequencies and directing the items of information to appropriate stores there at the stores having associated therewith means whereby the information is held only on a predetermined pattern of a specified received signal being maintained.

Preferably the predetermined pattern of a received signal is a reception of at least a predetermined rate of occurrence of a particular coded representation.

The system envisaged herein employs a plurality of (say N) signal frequencies and the addresses of stores are represented by combinations of a lesser number (say *n*) of said frequencies, the receiving equipment being arranged to respond only to a reception of *n* frequencies in this respect.

The information may be represented by two further frequencies a "1" digit being represented by the presence of one and the absence of the other and a "0" digit being represented by the absence of the one and the presence of the other.

Alternatively, the information may be merely represented by the presence or absence of a particular address code.

Further, said particular codes representation may be a coded representation transmitted at spaced intervals and which is also employed to provide a transfer signal for transferring items of received information from a temporary to a final register.

The frequencies employed may preferably be generated and received by means employing so-called fail-safe electromechanical filters such that highly stable and sharply selective and noninterfering frequencies are provided.

Figure 1:
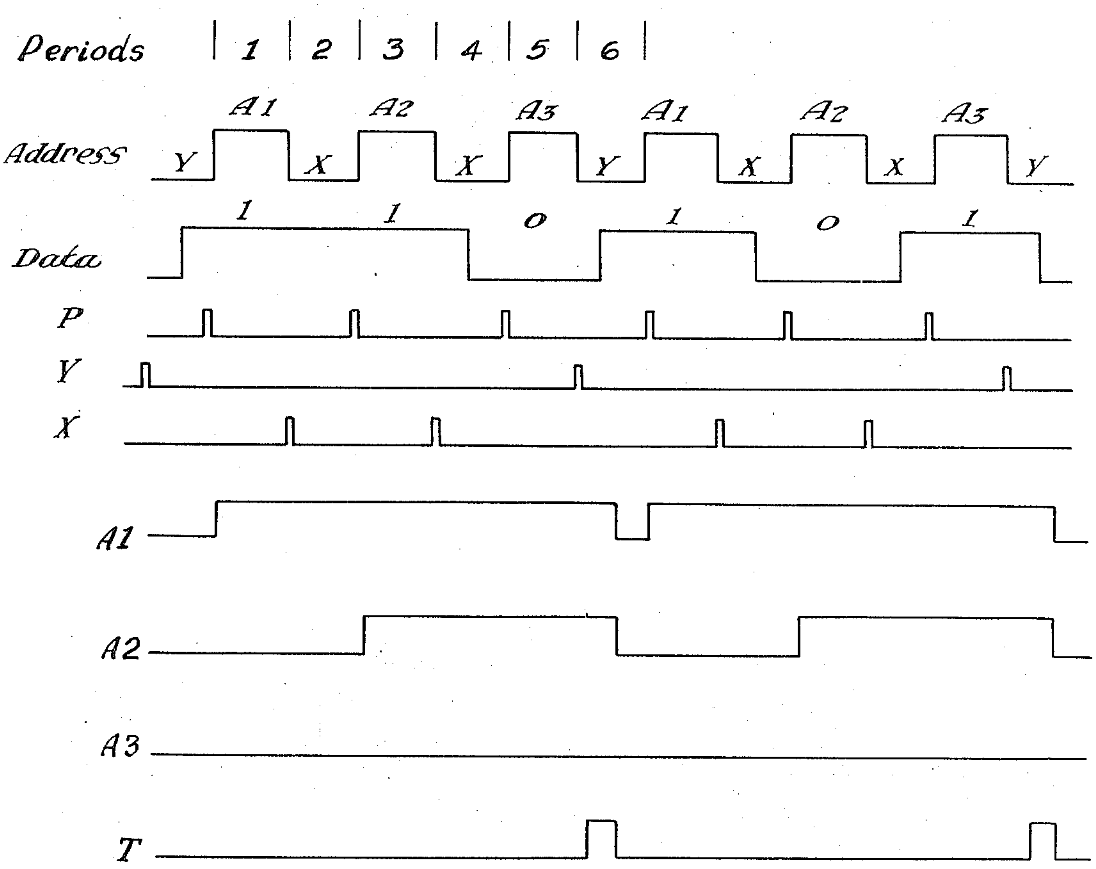
Figure 2:
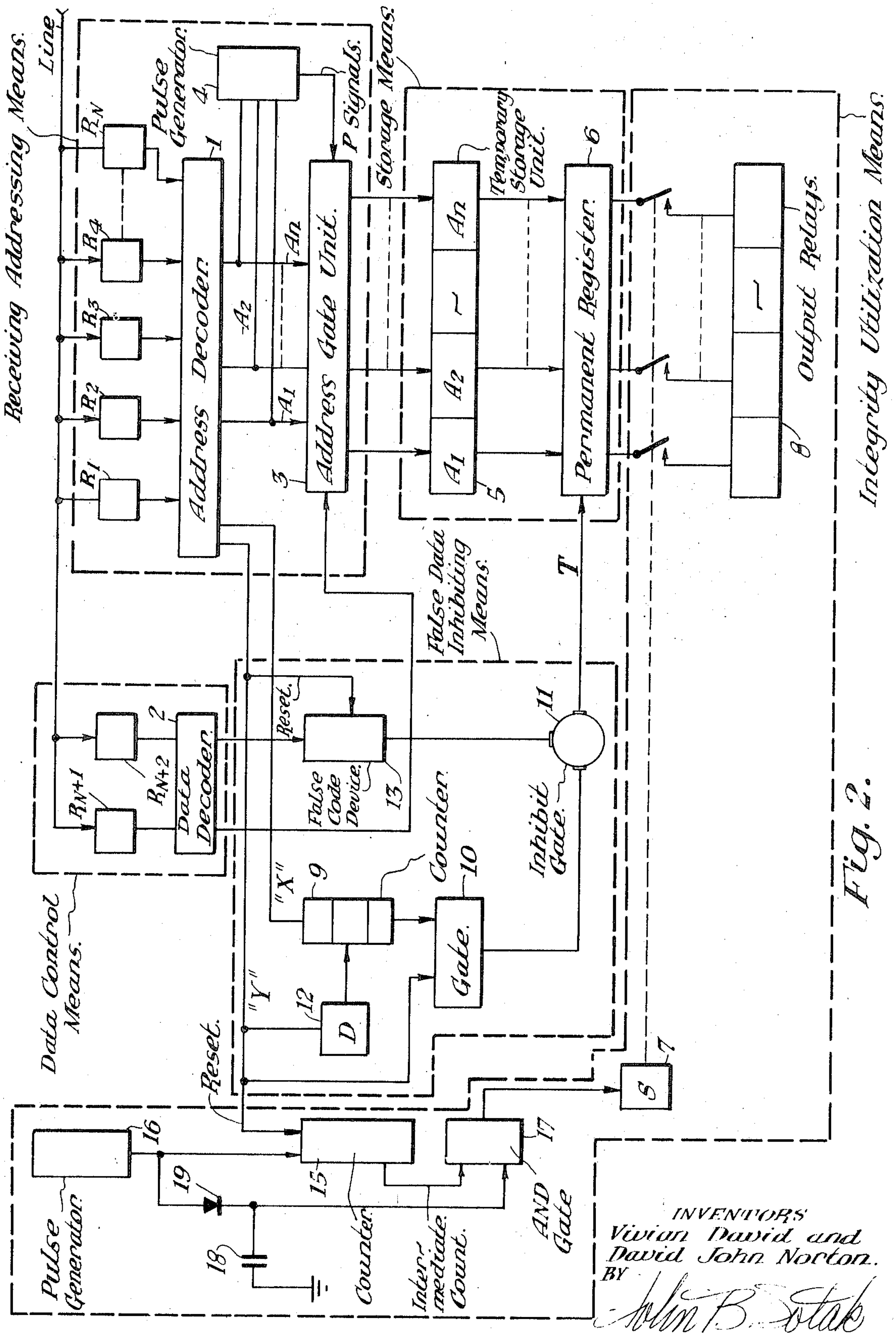

In order that the present invention may clearly understood and readily carried into effect, the same will be further described by way of example with reference to the accompanying drawings in which FIG. 1 illustrates graphically a method of setting up addresses and information codes in sequence for the purposes of a system in accordance with the invention and FIG. 2 illustrates in block schematic form receiving apparatus for a remote location in accordance with one embodiment of the invention.

As will have been appreciated, although applicable to so-called one-shot systems, the invention is basically concerned with a form of sequentially scanning transmission system in which items of information are scanned in succession for transmission as combinations of coded frequencies to one or more remote locations. Thus the transmission apparatus at the one location is assumed to comprise a plurality of oscillators which are stabilized by mechanical filters and conditioned to operate in combinations dependent upon whether successively scanned items of information are digits "0" or digits "1" and corresponding also to the location of the particular item of information. Thus the transmitting apparatus may comprise a clock or a sequential counter which conditions successive items of information to be read out and applied to a coding device which conditions respective oscillators for transmission to the remote location. Further, the frequencies are assumed to be transmitted over a single transmission line to the remote location.

In order to alleviate the danger that if one frequency is absent it is not known for certain whether this is because it is a genuine aspect of the code or whether the channel has failed, a form of coding which employs only *n* out of N frequencies ($n<N$) is employed so that not only it is possible to check the correct code but also that the correct number of channels is in operation.

In the system envisaged herein in which the information is transmitted by means of separate frequencies as compared with the addresses, a danger that interference on the line may give rise to a binary "1" item of information instead of a binary "1" item of information on reception, is virtually removed by the data being sent being coded in the form of "0" equals "01" and "1" equals "10," the "00" and "11" conditions being regarded as error conditions. Thus, as indicated previously, a digit "0" is represented by the absence of one frequency and the presence of another and the digit "1" is represented by the presence of the one frequency and the absence of the other.

In order that successive addresses may be positively separated at reception, successive address codes are transmitted interleaved with an end-of-bit code (to be referred to as the X code) the latter being replaced by a further instinctive code (to be referred to as the Y code) to indicate the end of a word.

As will be seen, the X code enables a predetermined data sampling instant to be provided for each address.

Referring to FIG. 1, a simplified coding scheme for three addresses is illustrated. The first waveform illustrates the transmission of two three-bit words to addresses A1, A2, A3. The words are defined by the Y signal and the bit intervals are defined by the X signals, and the front edges of the X and Y codes are employed to produce X and Y pulses as indicated, the latter are employed via a delay device to be referred to hereinafter to produce a P signal which is employed for sampling data a typical representation of which is given in the second waveform of FIG. 1.

Referring now to FIG. 2, received frequency groups are applied in parallel to tuned receivers R1, R2, R3, . . . RN associated with an address decoder represented by the block 1 and also to a pair of further tuned receivers RN+1 and RN+2 associated with the data decoder represented by block 2. The address decoder 1 as outputs corresponding to each of the addresses at the receiving location and these are applied to an address gate unit represented by bock 3 which also receives pulse P from a pulse generator 4 connected to respond with slight delay to the front edges of received address codes. The address gate outputs are applied to a temporary register unit 5 and associated with this temporary register unit is a permanent register represented by block 6 connected via contacts of a suicide relay 7, to output relays represented by block 8.

The address decoder 1 is also provided with circuits for decoding the X and Y codes and the X code is applied to a counter represented by block 9 the output of which corresponding to *n* frequencies received is applied as one input to a gate 10. The other input to the gate 10 is constituted by the end of word, Y signal, and the output of the gate 10 is applied as a transverse signal via an inhibit gate 11 to be referred to hereinafter, as a data transfer signal to the permanent register 6, Reset means for the counter 9 is provided responsive to the end of word, Y signal via a small delay represented by block 12.

The data decoder 2 has an output which is connected to the address gate 3 to provide the data information for transmission by the address gate in accordance with the address codes to the respective temporary register stages of 5.

The data decoder 2 also has a false code output which in response to a code which represents either a "1" digit of a "0" digit, sets a false code device represented by block 13 which provides the inhibit input to the inhibit gate 11, previously referred to. The device 13 is resettable moreover by the Y signal as indicated.

The end of word Y, signal is further applied as a reset signal to a counter represented by block 15 which counts pulses from a pulse generator 16. The counter is provided further with an output corresponding to an intermediate count on its range, this output being applied to an AND-gate 17. The other input to the gate 17 is derived from a capacitor 18 which is charged up via a diode 19 from the pulse generator. The output of gate 17 is operable to maintain energized the suicide relay 7 referred to in the foregoing.

Referring now to the operation of the receiving apparatus of FIG. 2, it will be appreciated that signals received are constituted by groups of predetermined discrete frequencies to which the receivers R1 and RN may be responsive. In accordance with the combination of the received frequencies the address decoder produces outputs to the address gates represented by block 3 and in accordance with the accompanying data signal derived from the data decoder in response to the response of receivers RN+1 and RN+2, the items information respect to the addresses being applied to the temporary register 5. Sampling of the received decoded data signals corresponding to the successive addresses is achieved by the P signal via the pulse generator 4 which has a slight delay in response the front edge of the address codes in order that sampling takes place after all the frequencies have had an opportunity to become established in the particular receivers in question. Following reception of the first address, the decoder 1 responds to the combination of frequencies giving rise to the X code and this occurs following reception of each address in a word. Accordingly, the counter 9 operates and on attainment of the count corresponding to the length of the word, provides an input to the gate 10 which subsequently produces a data transfer signal via the gate 11 to transfer the received items of the information in the respective word to the permanent register 6. In the event of any false data code in the reception of the word, the code device 13 operated and the data transfer signal is inhibited such that the output relays are unaffected by the newly received word.

For the purpose of clarity, let us assume that the receiving apparatus of FIG. 2 is receiving a three-bit word. It will be appreciated that the transmission of a three-bit word will contain six intervals as shown by the numbered periods in FIG. 1. During period 1, $n$ out of N ($n$<N) frequencies will be transmitted to and will be received by the equipment as shown in FIG. 2. These initial frequencies will be decoded and will be used to energize the A1 bit address of the address decoder 1. At the same time, data 1 frequency (RN+1) is received and data 0 frequency (RN+2) is absent. This combination is detected by the data decoder 2 and a data 1 is fed to the adjacent gate unit 3. The presence of the bit address, which in this period is A1 (see FIG. 1), causes the pulse generator 4 after a short delay to produce a P signal which in combination with the data 1 signal opens the address gate unit 3 and thus the address A1 sets sets the temporary register 5 for that bit. During period 2, $n$ out of N ($n$<N) frequencies corresponding to X are received and thus counter 9 receives a one-count period. Periods 3 and 4 are similar to periods 1 and 2 except that $n$ out of N ($n$<N) frequencies correspond to the address bit A2 (see FIG. 1) so that the temporary register unit 5 subsequently becomes set by this bit. During period 5, $n$ out of N ($n$<N) frequencies corresponding to the address bit A3 (see FIG. 1) are received together with data 0 frequency, namely, RN+2 and the absence of data 1 frequency, namely. RN+1. Consequently, the data 1 signal is not present at the address gate unit 3 and the address bit A3 bit can not be shifted in the temporary register unit 5. During period 6, $n$ out of N ($n$<N) frequencies corresponding to Y signal are being received over communication line. The Y signal is applied as one input to the gate 10 as well as to the counter 9. The counter 9 has a count of 2 since this is the number of times the X signal has been received by the counter 9. Since this is a correct count, the gate 10 produces an output which inhibits the gate 11. Further, since the data signals have been correctly received, data gate 11 will not be inhibited by the false code device 13. Thus, the transfer signal T is produced during period 6 as in FIG. 1, and this signal applied to the permanent register so that a transfer occurs, namely, the data in temporary register 5 is transferred to and updates the permanent register 6.

In order to ensure that the condition of the output relays 8 does not pertain for more than a predetermined time after any failure in the system such as transmission line break or repeated false codes have occurred, and that in appropriate control or indication information shall not be provided, the suicide relay S is provided. This relay is held energized on the basis that firstly the pulse generator 16 is working and charging the capacitor 18 and secondly that the counter 15 has not gone beyond the predetermined state to provide an output to 17. This state is preselected so that it cannot be reached if a Y signal is missed once or twice. The counter is designed moreover so that it is not reset by the Y signal in the event of it overfilling.

As an alternative to the manner of operation of the suicide relay 7 described above, this relay may be arranged to be kept energized by the X or Y pulses directly. Assuming that Y pulse are used, these may be suitably amplified and used to charge a capacitor via a diode. The capacitor can be arranged to have a discharge such that the capacitor is normally retained sufficiently charged by Y pulses to hold the relay energized. Interruption of the pulse due to a fault allows the relay 7 to drop out.

While the system now described in the foregoing envisages the provision of discrete frequencies for the transmission of data as distinct from the address to which the data pertains, these frequencies may if desired be omitted and the presence or absence of a particular S code may be employed to indicate a digit "1" or a "0" as the case may be. A system in this context affords the possibility of "one-shot" operation by only transmitting items of information when (say) a change occurs. In this case an alternative signal has to be transmitted to maintain the S relay energized.

By employing a coding scheme for addresses in which only $n$ out of N frequencies ($n$<N) are employed the address decoder may be arranged to only respond to the requisite number of frequencies to identify a particular code. Further, by employing in a continuously scanning system, the end-of-word code for "topping up" the suicide relays 7, "out-of-date" information is always rejected regardless of the correct functioning of the system. Assuming that fail-safe frequency transmission and reception means are provided and fail-safe logic is included, a completely fail-safe information transmission system may be provided which is especially suitable for railway signaling remote control and indication.

Having thus described our invention, what we claim is:

1. An information-communicating system for receiving and synchronizing information data transmitted from one location to a remote location, and including in combination:

a. receiving-addressing means having an N number of inputs corresponding to an N number of input frequencies, an $n$ number of input frequencies transmitted in a preselected sequence such that the occurrence of each specific frequency is within a predetermined time period, and wherein $n$ is less than N, said receiving-addressing means also having a data input, said combination of $n$ number of input frequencies comprising an address for $n$ particular locations and defining the length of a word for a given function, said word comprising $n$ number of bits appearing on $n$ number of outputs from said receiving-addressing means, said receiving-addressing means having an end-of-bit output pulse which is produced at the end of each predetermined time period and an end-of-word output pulse which is produced at the end of the $n^{th}$ predetermined time period, b. data control means having a plurality of inputs corresponding to an equal plurality of data frequencies which produce a first and second control data output, said first control data output electrically connected to said data input of said receiving-addressing means and being in either a first or a second binary condition dependent upon the presence or absence of selected ones of said plurality of data frequencies, the presence of said first binary condition on said data input and the simultaneous occurrence of one of said $n$ number of address frequencies causing said first binary condition to be produced on the corresponding one of said $n$ number of outputs of said receiving-addressing means, and the presence of said second binary condition on said data input and the simultaneous occurrence of one of said $n$ number of address frequencies causing said second binary condition to be produced on the corresponding one of said $n$ number of outputs of said receiving-addressing means, c. a false data inhibiting means having a first and a second input electrically connected to said receiving-addresssing means to respectively receive said end-of-bit output pulse and said end-of-word output pulse, said false data inhibiting means having a third input electrically connected to said control data output of said data control means and being in a first binary condition whenever all of said plurality of data frequencies are present on said plurality of inputs to said data control means and also being in said binary condition whenever none of said plurality of data frequencies are present on said plurality of inputs to said data control means, said third input to said false data inhibiting means being in a second binary condition in all other instances, said false data inhibiting means also having a registry control output being in said first binary condition only at the end of said $n^{th}$ predetermined time period and in the presence of said first binary condition on said third input to said false data inhibiting means, said registry control output being in said second binary condition in all other instances, said first and second inputs to said false data inhibiting means employed to ensure the presence of said first binary condition on said registry control output only at the end of said $n^{th}$ predetermined time period, said second input to said false data inhibiting means employed to recycle said false data inhibiting means at the end of a word, d. storage means having $n$ number of inputs and an $n$ number of outputs, said $n$ number of inputs of said storage means electrically connected to said receiving-addressing means to receive said $n$ number of outputs of said receiving-addressing means, said $n$ number of inputs to said storage means being initially temporarily stored in a sequential manner, said storage means also electrically coupled to said registry control output from said false data inhibiting means, said $n$ outputs of said storage means simultaneously appearing as $n$ number of bits only in the presence of said second binary condition on said registry control output of said false data inhibiting means, thereby providing said synchronizing of said information data.

2. The information-communicating system of claim 1 wherein said receiving-addressing means comprises an N number of frequency-responsive receiving devices, an address decoder means, a pulse-generating means, and an address gate unit, said frequency-responsive receiving devices electrically associated with address decoder means so that said address-decoder means sequentially produces a $n$ number of address frequencies, said $n$ number of address frequencies sequentially applied to said pulse-generating means, the initial occurrence of each of said $n$ number of address frequencies generating a pulse from said pulse-generating means, said pulse from said pulse-generating means as well as said data input applied to said address gate unit to follow said $n$ number of outputs to be produced by said receiving-addressing means said end-of-bit output pulse and said end-of-word output pulse of said receiving-addressing means being produced by said decoder means.

3. The information-communicating system of claim 1 wherein said data control means comprises a plurality of frequency-responsive devices electrically associated with a data decoder means to produce said first and said second control data outputs from said data control means.

4. The information-communicating system of claim 1 wherein said false data inhibiting means comprises a false code device, a counting means, a delaying device, a gate, and an inhibiting control means, said false code device electrically connected to said third input to said false data inhibiting means for delivering a signal to said inhibiting control means whenever said third input condition, said false code device also electrically connected to said second input to said false data inhibiting means whereby a reset command is produced at the end of said $n^{th}$ predetermined time period, said counting means receiving said fist input to said false data inhibiting means and adapted to count each of said end-of-bit pulses, said counting means also receiving said second input to said false data inhibiting means through said delaying device such that said counting means will become reset after the $n^{th}$ end-of-bit pulse has appeared on said first input to said false data inhibiting means, said counting means producing an output pulse simultaneously with the occurrence of the $n^{th}$ end-of-bit pulse on said first input to said false data inhibiting means, said output pulse from said counting means as well as said second input to said false data inhibiting means applied into said gate, and said gate producing an output pulse at the end of said $n^{th}$ predetermined time period which is also applied to said inhibiting control means, said inhibiting control means providing said registry control output.

5. The information-communicating system of claim 1 wherein said storage means comprises a temporary storage unit electrically coupled to a permanent register means, said temporary storage unit electrically connected to said $n$ number of inputs to said storage means, said permanent register electrically connected to said registry control output from said false data inhibiting means to produce said $n$ number of outputs of said storage means.

6. The information communicating system as defined in claim 1 including an integrity utilization means having an electromagnetic device which is deenergized a predetermined time after the occurrence of a failure in the system.

7. The information-communicating system of claim 6 wherein said integrity utilization means comprises an integrity pulse-generating means having an output pulse train an integrity counting means having a first and second input and an output, a capacitive device having an input and an output, an integrity gate having a first and second input and an output, an integrity address output inhibiting means having an input and controlling a $n$ number switching means electrically connected to a $n$ number of address output utilization means from said $n$ number of outputs of said storage means, said output pulse train of said integrity pulse generating means as well as said end-of-word output from said receiving-addressing means electrically connected as said first and said second inputs to said integrity counting means respectively, said second input to said integrity counting means resetting said integrity counting means at the end of said $n^{th}$ predetermined time period, said output from said integrity counting means producing an intermediate count pulse whenever an intermediate count has been attained by said counting means, said intermediate count preselected to appear, a predetermined amount of time following said $n^{th}$ predetermined time period, said input to said capacitive device electrically connected to said output of said integrity pulse-generating means such that said capacitive device will be continuously charged, said output of said capacitive device electrically connected to said second input of said integrity gate, said output from said integrity counting means electrically connected to said first input of said integrity gate such that an output pulse will appear on said output of said integrity gate only when said intermediate count pulse is present on said output from said integrity counting means, said output from said integrity gate electrically connected to said input to said integrity address output inhibiting means such that said $n$ number of switching means controlled by said integrity address output inhibiting means allows said $n$ number of outputs from said storage means to said $n$ number of output address utilization means at the end of said $n^{th}$ predetermined time period only in the absence of said intermediate count output pulse from said integrity counting means.

8. The information-communicating system of claim 7 wherein said integrity address output inhibiting means is a relay.

9. The information-communicating system of claim 7 wherein said $n$ number of switching means are relay contacts.

10. The information-communicating system of claim 7 wherein said input to said capacitive device is electrically connected to said output of said integrity pulse-generating means by a diode.

* * * * *